(12) United States Patent
Twerdochlib

(10) Patent No.: US 7,064,811 B2
(45) Date of Patent: Jun. 20, 2006

(54) IMAGING ROTATING TURBINE BLADES IN A GAS TURBINE ENGINE

(75) Inventor: Michael Twerdochlib, Oviedo, FL (US)

(73) Assignee: Siemens Power Generation, Inc., Orlando, FL (US)

( * ) Notice: Subject to any disclaimer, the term of this patent is extended or adjusted under 35 U.S.C. 154(b) by 48 days.

(21) Appl. No.: 10/849,992

(22) Filed: May 20, 2004

(65) Prior Publication Data

US 2005/0270519 A1    Dec. 8, 2005

(51) Int. Cl.
*G01P 3/40* (2006.01)
(52) U.S. Cl. .......................... 356/24; 356/23
(58) Field of Classification Search ............. 356/23, 356/24, 25, 26, 426
See application file for complete search history.

(56) References Cited

U.S. PATENT DOCUMENTS

| | | | |
|---|---|---|---|
| 3,738,104 A * | 6/1973 | Rosa | 60/39.281 |
| 4,634,291 A * | 1/1987 | Bantel et al. | 374/7 |
| 5,090,797 A | 2/1992 | Cleveland et al. | |
| 5,445,027 A * | 8/1995 | Zorner | 73/593 |
| 5,771,406 A | 6/1998 | Sakamoto et al. | |
| 5,835,798 A | 11/1998 | Kitagawa | |
| 5,850,576 A | 12/1998 | Matsuzawa | |
| 6,208,464 B1 | 3/2001 | Tsukamoto et al. | |
| 6,864,498 B1 * | 3/2005 | Katzir et al. | 356/23 |
| 6,992,315 B1 * | 1/2006 | Twerdochlib | 250/559.08 |
| 2004/0101023 A1 * | 5/2004 | Choi | 374/141 |

* cited by examiner

*Primary Examiner*—F. L. Evans

(57) ABSTRACT

A system (10) for imaging a rotating turbine blade (20) includes an image projector (12) receiving a moving image of the rotating blade and projecting a movement-compensated image. The system also includes an image receptor (14) for receiving the movement-compensated image. A sensor (16) is provided for generating information (28) indicative of a velocity of the rotating turbine blade and a processor (18) generates a drive signal (30) responsive to the information for controlling a position of the image projector. The image projector is controlled to receive the moving image at a desired angular position and to project the movement-compensated image to the image receptor so that the movement-compensated image appears stationary relative to the image receptor.

14 Claims, 2 Drawing Sheets

IMAGING ROTATING TURBINE BLADES IN A GAS TURBINE ENGINE

FIELD OF THE INVENTION

This invention relates generally to inspection of gas turbines, and more particularly, to reducing motion-induced blurring of images of rotating turbine blades.

BACKGROUND OF THE INVENTION

Thermal barrier coatings (TBCs) applied to turbine airfoils are well known in the art for protecting parts such as blades and vanes from elevated operating temperatures within a gas turbine engine. However, TBCs are subject to degradation over their service life, and need to be inspected periodically to assess the integrity of the coating. In the past, inspection of coated turbomachinery components has been performed by partially disassembling the gas turbine engine and performing visual inspections on individual components. In-situ visual inspections may be performed without engine disassembly by using a borescope inserted into a gas turbine engine, but such procedures are labor intensive, time consuming, and require that the gas turbine engine be shut down, and the rotating parts held stationary for the inspection. To avoid having to take a gas turbine engine off line for inspection, resulting in an undesirable loss of power producing capability, there is a strong incentive to be able to perform TBC inspections while the gas turbine is operating. It has been proposed to inspect rotating turbine blades with an image receptor, such as an IR camera, positioned in a port in the inner turbine casing, while the turbine is operating. However, turbines are typically operated at a rotational speed of about 3600 revolutions per minute (RPM) and images of the moving blades may be "smeared" or blurred due to a motion of the blades, especially if a shutter speed of the camera cannot be made sufficiently fast enough to "stop" the motion of the blade.

BRIEF DESCRIPTION OF THE DRAWINGS

The invention will be more apparent from the following description in view of the drawings that show.

DETAILED DESCRIPTION OF THE INVENTION

The inventor has developed an innovative system and method for reducing smearing or blurring of images of rotating turbine blades. Generally, the method includes moving an image of a rotating turbine blade in response to a sensed velocity of the blade so that the image appears stationary relative to an image receptor. Advantageously, a resulting image recorded by the image receptor may be free of blurring effects that may otherwise be caused by movement of the turbine blade with respect to the image receptor. Accordingly, the invention provides a higher resolution image of the moving blade than is possible using conventional turbine blade imaging techniques. In an aspect of the invention, the method includes positioning an image projector to receive a moving image of a rotating blade, and then projecting a movement-compensated image to an image receptor to record the image. The method may also include sensing a velocity of the rotating turbine blade and then controlling the image projector to project the movement-compensated image so that the movement-compensated image appears stationary relative to the image receptor.

Figure 1:
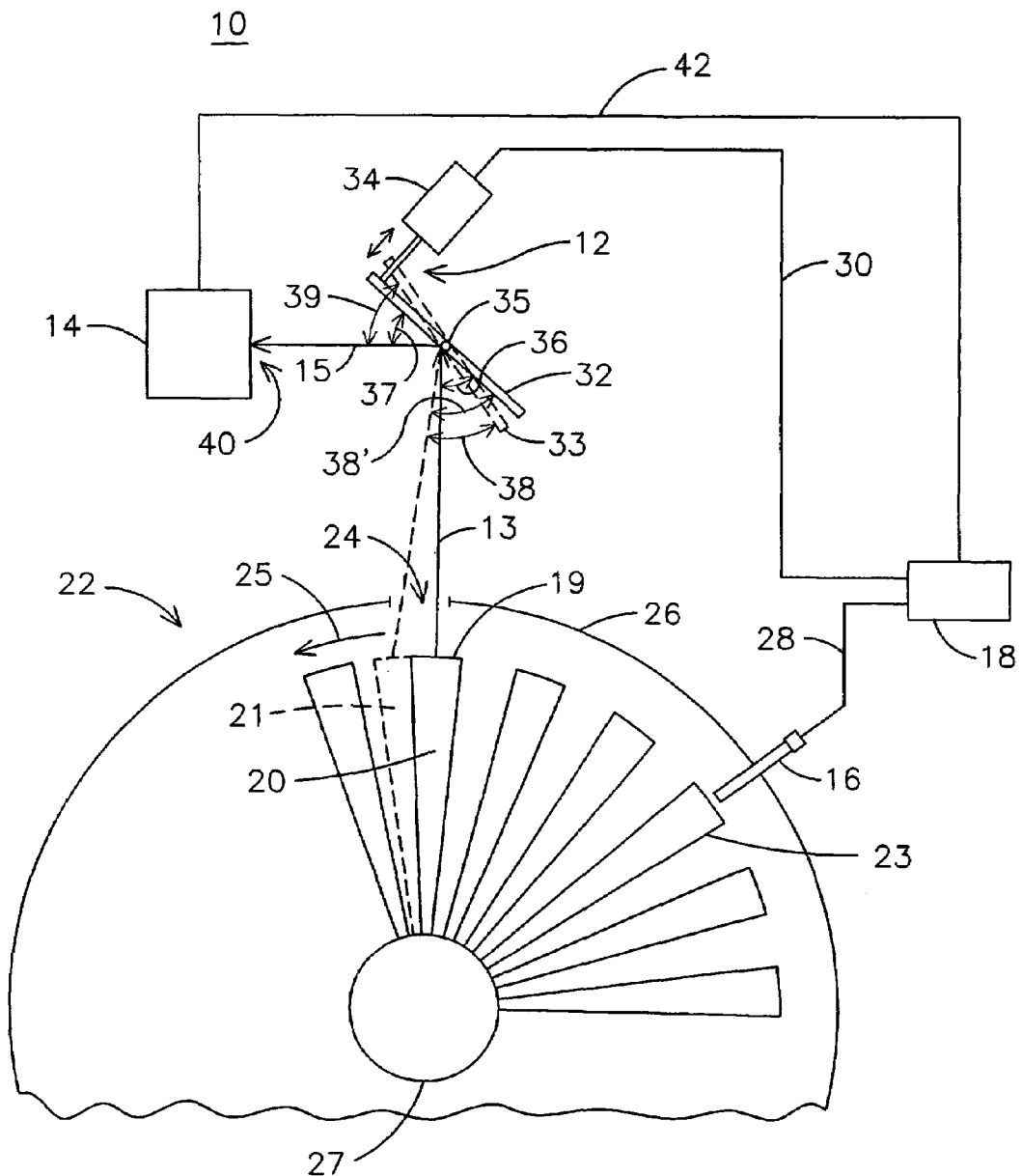
FIG. 1 is a partial cross sectional schematic view of a turbine section of a combustion turbine engine including an exemplary embodiment of a system for imaging a rotating turbine blade.

The innovative method described above may be implemented using a system as depicted in FIG. 1. FIG. 1 is a partial cross-sectional schematic view of a turbine section 22 of a combustion turbine engine including an exemplary embodiment of a system 10 for imaging a rotating turbine blade 20. The system 10 generally includes an image projector 12 disposed to receive a moving image of the rotating blade 20 along a light path 13 and projecting a movement-compensated image along a different light path 15. The image projector 12 may be positioned proximate a port 24 in the inner turbine casing 26 for receiving a radially viewed image of the moving blade 20. The image projector 12 provides the movement-compensated image to an image receptor 14 positioned for receiving the movement-compensated image from the image projector 12 along light path 15. The image receptor 14 may be capable of receiving energy representative of an image, such as electromagnetic energy or acoustic energy, and storing the received energy. For example, the image receptor 14 may be a camera that converts light to an electrical signal, such as a focal plane array of the type used in a digital or video camera. In an embodiment, the image receptor 14 may be an infrared camera.

A sensor 16 may be provided to generate information 28 indicative of a velocity of the rotating turbine blade 20. For example, a magnetic reluctance sensor may be positioned in the inner turbine casing 26 to detect a velocity of a turbine blade 20 as it passes the sensor 16. As understood in the art, the blade 20 induces a time and amplitude varying response in the reluctance sensor corresponding to passage of a blade tip 19 past the sensor. Accordingly, the information 28 may include a time varying amplitude signal proportional to the rate of change in magnetic flux through the sensor resulting from the passage of the blade tip 19. For example, the reluctance sensor may produce a positive-peaked voltage signal portion as the blade tip 16 approaches the sensor, then produce a negative-peaked voltage signal portion as the blade tip moves away from the sensor 16, so that passage of the blade tip 19 may be indicated by a zero-value voltage crossing between the positive-peaked voltage signal portion and the negative-peaked voltage signal portion. Accordingly, the time varying amplitude signal produced by the reluctance sensor may have a relatively large negative slope as the blade tip 19 passes the sensor, providing a higher degree of noise immunity compared to other portions of the signal. In addition, a measured time between the indicated arrivals of blade tips 19 may be used to determine a rotational speed of a turbine shaft 27 and a corresponding blade velocity. In another aspect, a speed wheel or shaft synchronous sensor may be used to sense a velocity and/or a position of the turbine blade 20. It should be understood that the sensor 16 need not sense the blade 20 being imaged, but may infer a position and velocity of the blade 20 being imaged via knowledge of a position of the sensor 16 relative to the turbine and a geometry of the turbine. For example, a different blade's 23 velocity and position may be sensed to determine the imaged blade's 20 velocity and position. In another aspect of the invention, an eddy current sensor may be used to generate information 28 indicative of a velocity of the rotating turbine blade 20.

A processor 18, in communication with the sensor 16, may receive the information 28 from the sensor 16 and generate a drive signal 30 responsive to the information 28 for controlling the image projector 12. For example, the processor 18 may be configured to process the information 28 provided by the sensor 28 to extract a velocity of the sensed turbine blade 20, such as by calculating a velocity based on the time between blade tip arrivals provided by a reluctance sensor. In this manner, the time that blade 23 is directly below the reluctance sensor 16 may be indicated by the sensor signal being zero volts and having a negative slope, such as when the blades 23 is in the position shown in FIG. 1 with respect to the sensor 16. The processor 18, after receiving the information 28, generates a drive signal 30 controlling the image projector 12 to receive the moving image of the turbine blade 20 at a desired angular position of the projector 12 and to project the movement-compensated image so that the movement-compensated image appears stationary relative to the image receptor 14. The processor 18 may also generate a shutter signal 42 based on a sensed position of the blade 20, for example, derived from the sensed information 28, for activating the image receptor to acquire the movement-compensated image corresponding to a desired position of the blade 20. To identify a desired blade to be imaged, a turbine rotation phasor signal generated, for example, by detecting an indication, such as a notch on the shaft 27, may be used. In addition, a blade tip passage signal or a toothed wheel type sensor signal may be used to adjust the shutter trigger to compensate for small changes in shaft speed. The sensed position of the blade 20 may also be incorporated in the drive signal 30 to position the image projector 12 for receiving the turbine blade image.

In an aspect of the invention, the image projector 12 may include a mirror 32 for receiving the image of the turbine blade 20 and reflecting the movement-compensated image to the image receptor 14. Innovatively, the mirror 32 may be moved by a positioner 34 about a planar axis 35 to maintain an angle of incidence of the image with respect to the image projector 12, so that the movement-compensated image is projected to a desired location 40 on the image receptor 14. The mirror 32 may be positioned so that the image of the turbine blade 20 is incident at a first angle 36 of incidence. According to known physical optics laws, the image is then reflected from the mirror 32 to the image receptor 36 at an angle 37 of reflection equal to the angle 36 of incidence. As the turbine blade 20 rotates, for example, in a counter clockwise direction as indicated by dotted line depiction 21, during an imaging exposure period, the angle of incidence of the image with respect to the mirror 32 changes (for the geometry depicted in FIG. 1, the angle of incidence would become larger.) If the angular position of the mirror 32 was not changed, the image would be reflected at an angle 38' equal to a new angle of incidence, different from the first angle 36, thereby shifting the reflected image on the image receptor 14 away from location 40 (for the geometry depicted in FIG. 1, the reflected image would be shifted downward), resulting in smearing or blurring of the reflected image acquired by the image receptor 14. However, by changing the angular orientation of the mirror 32 based on a second angle 38 of incidence (as indicated by the dotted line depiction 33 of the mirror 32), the image may be reflected at an angle 39 equal to the second angle 38 of incidence from the mirror 32 to the same location 40 on the image receptor 14. By changing the angle of the mirror 32 corresponding to a changing angle of incidence of the image of the moving blade 20, the movement-compensated image reflected by the mirror 32 may be made to appear stationary on the image receptor, thereby mitigating any blurring effects induced by movement of the blade 20. For example, the mirror's 32 angle may be changed according to the formula: 0.5*(angle 38'−angle 36).

Although the image receptor 14 or an optical fiber in communication with an image receptor 14 may be moved to track the movement of the turbine blade 20, a moving mirror arrangement as described herein offers a mechanical advantage over moving the image receptor 14 or the optical fiber. For example, depending on a distance between the image projector 12 and the turbine blade 20 and a distance between the image projector 12 and the image receptor 14, the mirror 32 may not need to be moved as much as the image receptor 14 would need to be moved to track the movement of the turbine blade 20. The mirror 32 may only need to be moved 0.5 degrees for every 1.0 degree the turbine blade 20 traverses in its rotational arc to keep the movement compensated image of the blade 20 at the same location 40 on the image receptor 14.

In a further aspect of the invention, the positioner 34 may include a reciprocal driver to move the mirror 32 about the axis 35 to change the angle of the mirror 32 according to a drive signal 30. A length of throw, or amplitude, and frequency of a reciprocating movement required to move the image to keep the movement-compensated image in one location 40 on the image receptor 14 may be determined based on such factors as the geometry of the image projector 12, such as a size and placement of the movement axis 35 of the mirror, a distance between the image projector 12 and blade 20, a distance between the image projector 12 the image receptor 14, and a velocity of the turbine blade 20. In an embodiment, an electrodynamic transducer, (such as electrodynamic transducer Model ET-127, available from Labworks, Inc.) may be used to reciprocally drive the mirror 32 about the axis 35. The desired drive amplitude and drive frequency may be incorporated in the drive signal 30 provided to the transducer by the processor 18 based on a sensed velocity and position of the blade 20. A phasing of mirror movement in relation to detection of a blade 23 may be adjusted to ensure that an image of the desired blade is captured when the blade 20 to be imaged is positioned proximate the mirror 32. In addition, the phasing of the mirror movement may be adjusted, such as by delaying or by advancing movement actuation, to acquire different blades of the turbine.

Figure 2:
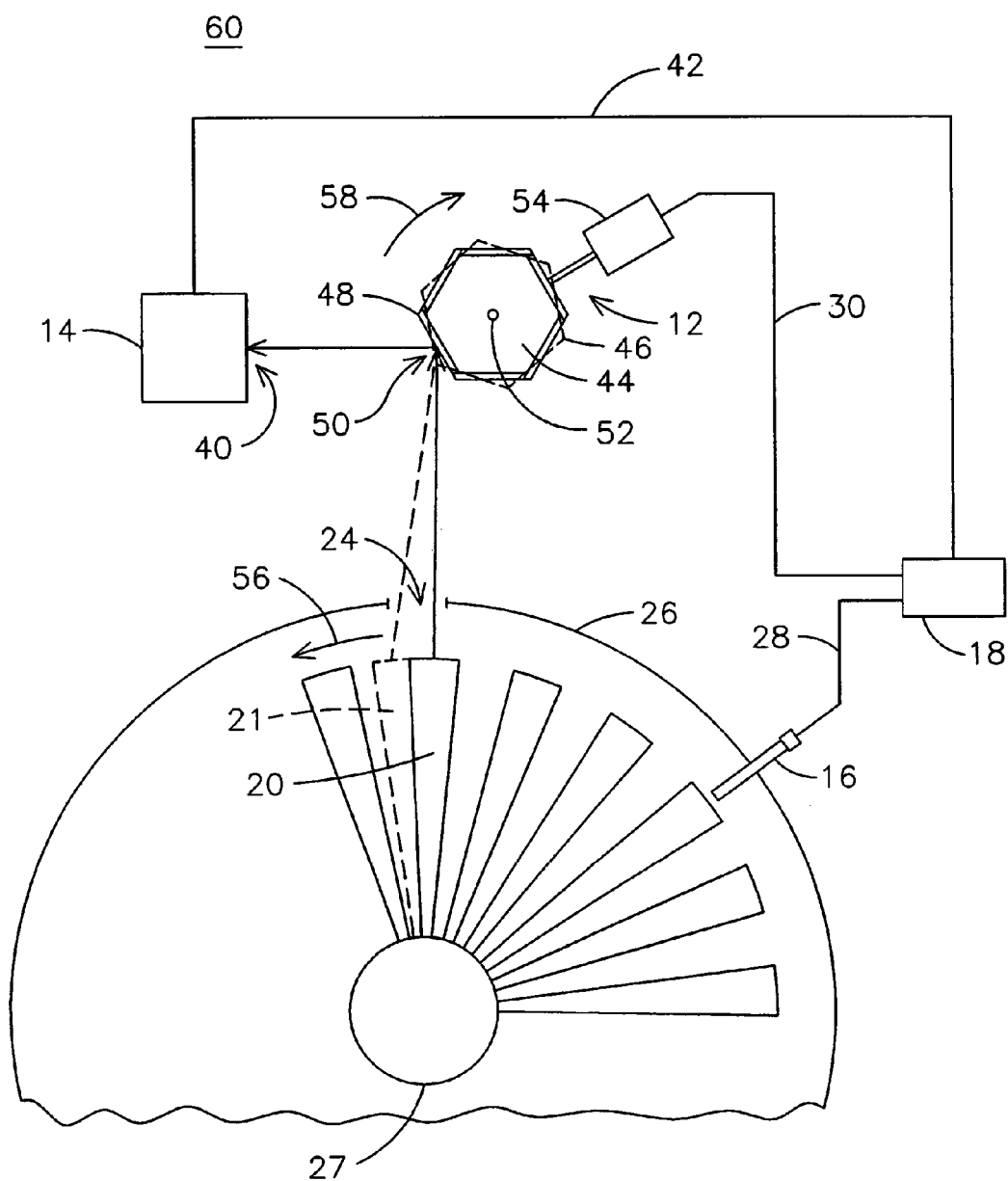
FIG. 2 is a partial cross sectional schematic view of a turbine section of a combustion turbine engine including another exemplary embodiment of a system for imaging a rotating turbine blade.

FIG. 2 depicts another exemplary embodiment of a system 60 for imaging a rotating turbine blade 20. As shown in FIG. 2, the image projector 12 may include a mirror 48, or array of mirrors, mounted for rotation about an axis 52 to keep an image of a rotating turbine blade 20 positioned at a certain location 40 on an image receptor 14. For example, a rotating mount 44 having a hexagonal cross section may include a mirror 48 attached to a face 50 of the mount 44 for receiving an image of the turbine blade 20 and projecting a movement-compensated image to the image receptor 14 by moving the mirror 48 in response to a changing angle of incidence of the image as described above with regard to the system of FIG. 1. For example, if the blade 20 is rotating in a counter-clockwise direction 56, (as indicated by the dashed line representation 21) the mount 44 may be rotated in a clockwise-direction 58 (as indicated by the dashed line representation 46) to compensate for movement of the image of blade 20 relative to the image projector 12.

To provide the necessary movement of the mirror 48, the mount 44 may be rotated about an axis 52 by a rotational driver 54, such as a motor. The rotational driver 54 may rotate the mount 44 with sufficient speed so that a face 50 of the mount 44 is moved to control an angle of incidence of the turbine blade image with respect to the mirror 48, allowing the movement-compensated image reflected from the mirror 48 to appear stationary on the image receptor 14. A rotational speed of the mount 44 may be determined based on a distance between the image projector 12 and blade 20 and a velocity of the rotating turbine blade 20.

Information 28 indicative of a velocity of the rotating turbine blade 20 may be generated by a sensor 16 and provided to a processor 18. The processor 18 may then generate a drive signal 30 responsive to the information 28 for controlling the image projector 12 to drive the mount 44 at a rotational speed proportional to the velocity of the turbine blade 20, so that a movement-compensated image is projected to appear stationary on the image receptor 14. The processor 18 may also generate a shutter signal 42 responsive to the information 28 based on a sensed position of the blade 20 for activating the image receptor 14 to acquire the movement-compensated image corresponding to a desired position of the blade 20. This position information may also be incorporated in the drive signal 30 to position the mirror 48 for receiving the turbine blade image when the turbine blade 20 reaches a desired position.

In an aspect of the invention, a phase of the mount's 44 rotation in relation to rotation of the shaft 27 may be adjusted to ensure that an image of a desired blade is captured when the blade to be imaged is positioned proximate a face 50 of the mount 44. For example, using a technique similar to a movie camera taking pictures of a rotating, spoked wagon wheel at a rate corresponding to a rotation of the wagon wheel (so that the wagon wheel appears to be "stopped" or rotating more slowly than it actually is rotating as a result of the known phenomenon of "aliasing"), the mount 44 may be rotated at a sufficient speed corresponding to a rotation of the shaft 27 so that a desired blade image is projected to the image receptor 14 by a mirror on a face of the mount 44. Then, by adjusting the speed of rotation of the mount 44 to effectively change a phase of rotation with respect to a shaft rotation, a different blade may be "stopped" by a different face so that the different blade is projected to the image receptor 14 without blur. If a number of faces of the mount 44 is comparable to a number of blades on the turbine, phase adjustment needs may be minimized compared to a mount having fewer faces.

In another aspect, the mirror mount 44 may be rotated slightly faster or slower than a rotation required to make the image appear stationary on the image receptor 14, and any remaining blurring may be removed by using a sufficiently fast shutter speed, for example, if a camera is used as the image receptor 14. For example, rotating the mount 44 slightly faster or slower than a rotation speed required to make the image appear stationary, a blade position with respect to the image projector 12 may be allowed to "drift" (much as an individual spoke of a filmed wagon wheel may appear to rotate slowly) so that different blades are "walked" into view to be acquired by the image projector 12. Accordingly, each blade of the turbine may be imaged by at least one of the faces of the mount when a face becomes aligned with the blade as the phase of the mount rotation is slightly changed with respect to the rotation of the shaft. Such a technique may also be used in conjunction with the image projector 12 described previously with regard to FIG. 1.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

We claim as our invention:

1. A system for imaging a thermal barrier coating of a rotating turbine blade comprising:
    an image projector receiving a moving infrared image corresponding to infrared radiation emitted by a thermal barrier coating of a rotating turbine blade and projecting a movement-compensated image;
    an infrared image receptor operable for receiving the movement-compensated image without a need for an illumination source;
    a sensor generating information indicative of a velocity of the rotating turbine blade; and
    a processor generating a drive signal responsive to the information for controlling a position of the image projector to receive the moving infrared image at a desired angular position and to project the movement-compensated image so that the movement-compensated image appears stationary relative to the infrared image receptor.

2. The system of claim 1, further comprising a sensor generating information indicative of a position of the rotating turbine blade.

3. The system of claim 2, further comprising a processor generating a shutter signal responsive to the information for activating the image receptor to acquire the movement-compensated image corresponding to a desired position of the blade.

4. The system of claim 1, wherein the image projector comprises:
    a mirror; and
    a positioner moving the mirror.

5. The system of claim 4, wherein the positioner comprises a reciprocal driver to move the mirror about an axis.

6. The system of claim 4, wherein the positioner comprises a rotational driver to rotate the mirror about a rotational axis.

7. The system of claim 1, wherein the sensor comprises a magnetic reluctance sensor.

8. A method of imaging a thermal barrier coating of a rotating turbine blade of a turbine rotor comprising:
    receiving infrared radiation emitted by a first blade of a row of rotating blades of a turbine rotor using a movable image projector without using an illumination source;
    sensing a velocity of rotation of the rotating blades;
    using the velocity to adjust a phase of movement of the movable image projector relative to the first blade to synchronize a projected image of the first blade relative to an image receptor;
    using the velocity to adjust a phase of movement of the movable image projector to bring a second blade into a field of view of the image projector; and
    using the velocity to adjust the phase of movement of the image projector to make a projected image of the second blade appear stationary relative to the image receptor.

9. The method of claim 8, further comprising sensing a position of at least one of the rotating turbine blades.

10. The method of claim 9, further comprising triggering the image receptor to acquire the projected image of the second blade when the second blade is positioned at a desired angular position.

11. The method of claim 8, further comprising maintaining an angle of incidence of the projected image of the second blade with respect to the image projector so that the projected image of the second blade is projected to a desired area on the image receptor.

12. The method of claim 8, further comprising disposing the image projector radially outward of the rotating turbine blades.

13. The method of claim 12 further comprising disposing the image projector along a line of view parallel with an axis of rotation of the turbine blades.

14. The method of claim 8, wherein sensing the velocity further comprises disposing a magnetic reluctance sensor radially outward of a turbine blade rotation path to generate a proximity signal indicative of the velocity and the angular position of at least one of the blades.

* * * * *